United States Patent

Hoffman et al.

[15] 3,655,414

[45] Apr. 11, 1972

[54] FOUNDRY MOLD PROCESS AND PATTERN COMPOSITION

[72] Inventors: William D. Hoffman, Park Forest; Allen E. Larson, Chicago, both of Ill.

[73] Assignee: Atlantic Richfield Company, New York, N.Y.

[22] Filed: June 10, 1969

[21] Appl. No.: 832,013

[52] U.S. Cl. ........................... 106/38.8, 106/230, 106/270, 164/45
[51] Int. Cl. ...................................................... C08h 9/06
[58] Field of Search ................ 106/38.8, 270, 272, 230, 38.2, 106/38.22, 38.3; 164/45

[56] References Cited

UNITED STATES PATENTS 3,209,421 10/1965 Shepherd ........................ 106/38.3 X
3,263,286 8/1966 Watts et al. ...................... 106/38.8 X
3,316,105 4/1967 Feagin ............................. 106/38.8

*Primary Examiner*—Lorenzo B. Hayes
*Attorney*—McLean, Morton and Boustead

[57] ABSTRACT

Novel pattern materials for use in investment casting by the Lost Wax process are disclosed. The pattern materials consist essentially of waxes such as petroleum waxes, natural vegetable or mineral waxes, synthetic waxes and various resinous materials derived from the refining of petroleum and wood resin, and mixtures of the above. The base wax generally has a melting point of between about 120° to 180° F. The base wax composition is improved by the inclusion of up to about 75 percent by weight, preferably a minor amount, of solid filler particles of a phthalic acid. Isophthalic acid is the preferred filler.

18 Claims, No Drawings

FOUNDRY MOLD PROCESS AND PATTERN COMPOSITION

The present invention involves pattern materials having a base wax and solid fillers which effect low-shrinkage of the compositions upon their cooling from the temperature of injection to ambient temperature during the making of wax patterns for the Lost Wax Process of investment casting. More specifically, this invention relates to improvements in low-shrinkage pattern materials and advantages accruing to the Lost Wax Process through the use of novel materials as solid filler components in pattern waxes.

Investment casting by the Lost Wax Process involves the making of a destructible wax pattern, commonly by injection molding the pattern in a master mold. The patterns then are dipped into a slurry of a suitable finely divided refractory mold material which sets up to form a solid shell around the wax pattern. Generally, the pattern is dipped into an aqueous slurry of finely divided (e.g., less than 325 mesh) silica flour, for instance, or a mixture of finely divided silica and zircon and then dried. This dipping is repeated until a fine surface is established. The silica-coated pattern is then dipped into an aqueous slurry of a larger particle size inorganic material, e.g., metal oxides such as alumina, of a particle size of about +100 mesh or larger to build up the refractory mold thickness. This dipping into the larger particle size slurry is repeated until the desired thickness is attained. The dipping slurry can be acidic or basic, for example, with a pH of up to about 9 being preferred. The pattern is subsequently removed from within the refractory mold, usually by heating and melting out the wax and burning any residue remaining inside the mold. Molten metal, such as an alloy, can then be poured into the refractory mold, thereby casting the desired metal shapes. Further details of the above process are well known to those skilled in the art.

One of the important requirements of pattern wax materials for high precision applications is that they exhibit low-shrinkage as the patterns cool from the respective injection temperatures, at which the waxes are liquid or semi-solid, to the ambient temperature at which the patterns are usually employed to make the refractory molds. Due to the low shrinkage characteristics, the dimensions of the refractory molds more closely correspond to those of the final metal castings. In this respect, it is common practice to use finely divided solid filler materials as components of the pattern wax materials in order to reduce the shrinkage of the resultant wax patterns. The filler particles are uniformly distributed throughout the wax, both in the melted state before injection, and in the solid state after injection molding the patterns. However, problems encountered through the use of various filler materials give rise to the need for different filler materials and improved pattern wax compositions such as those herein disclosed and claimed.

Nitrogen-containing fillers such as the ethylene stearamide, ethylene dilauramide, etc., described in U.S. Pat. No. 3,316,105 are somewhat compatible with the base wax compositions, especially at the melt-down temperature of the filled wax compositions. However, because of this compatability during melting, or while being maintained at the temperature required to keep the wax melted prior to injection into the master molds, the filler partially dissolves in the base wax, thus diminishing its desired function of decreasing shrinkage and making it difficult or impossible to keep the wax consistent in composition and properties.

Various attempts have been made to improve the characteristics of pattern waxes. Inorganic fillers such as powdered mica or silica have been employed but these materials are often left in the mold in small amounts subsequent to melting out of the wax pattern material. Some fillers are usually available as irregularly shaped particles, such as wood fiber, sugar or silica, but these are disadvantageous since they can inhibit the flow of the pattern wax into the master mold or out of the refractory molds. Polystyrene beads have also been used for some time as a filler but this material has disadvantages. For instance, during removal from the refractory mold, the pattern wax base can melt first and run out of the mold leaving a polystyrene residue. If heating rates are not properly controlled, the polystyrene will char, making it difficult to remove from the mold. Moreover, even if the polystyrene is melted properly, its viscosity or tacky consistency often causes it to pull away some of the refractory composition from the wall of the mold, thus introducing defects in the surface.

An object of this invention is to provide improved pattern materials compositions through the inclusion of novel filler materials in base pattern wax compositions to effect low-shrinkage of the wax patterns upon cooling from the molten or semi-solid state at the injection temperature to the solid state at ambient temperature. Due to minimization of shrinkage the compositions are especially suited for use in high-precision applications or in any application where dimensional reproduction in the patterns is an important and/or desirable factor.

Another object of this invention is to provide novel pattern wax compositions which contain a solid filler material with little or no water solubility, since some of the patterns come in contact with water during subsequent handling and processing. Other advantages in the use of the filler materials disclosed and claimed herein are: low melt viscosity and sublimation or complete combustion, which facilitates dewaxing and burning of any residue in the refractory molds; and melting point or softening point far enough above the melting point of the base wax to insure that the filler will not agglomerate or gel in the melting and pre-injection conditioning equipment. Also, the filler is essentially incompatible with the various base wax compositions so that significant partial solution will not occur during the sometimes prolonged pre-injection conditioning periods during which the wax is in a melted state. Such partial solution can diminish the functional performance of the filler materials.

These objects and advantages are realized through the use, as solid filler components of pattern wax compositions, of a finely divided solid phthalic acid taken from the group consisting of isophthalic acid, terephthalic acid and orthophthalic acid. The finely divided particles often have a size up to about 600 microns, preferably up to about 250 microns, in their maximum dimension. Particle sizes in the preferred range generally have smooth surfaces and desirable flow characteristics. Generally, the smaller the particles, the less likely they are to settle out at elevated temperatures at which the filler is in the solid state and the other components of the compositions are liquid. Isophthalic acid is the preferred filler material. The resulting pattern material compositions consist essentially of about 25 to 95 percent by weight of the base wax composition and about 5 to 75 percent by weight of the finely divided solid phthalic acid filler. The pattern material compositions preferably contain a major amount of the base wax and a minor amount of the filler material. Suitable base wax compositions can include petroleum waxes, natural vegetable or mineral waxes, synthetic waxes and various resinous materials derived from the refining of petroleum and wood resins, terpene-type resins or mixtures of these materials. The base wax compositions can thus contain one or more hydrocarbon materials or other organic materials having for instance, oxygen-containing groups, as in the case of stearic acid or abietic acid, or nitrogen-containing groups such as in the case of amides. The base wax compositions usually melt at temperatures in the range of about 120° and about 180° F. Suitable base wax blends include those containing about 5 to 40 weight percent paraffin wax, about 5 to 40 weight percent vegetable wax and about 15 to 50 weight percent terpene resins. These materials are solids at ambient temperature and the paraffin waxes often melt in the range of about 135° to 160° F., while the microcrystalline waxes melt in the range of about 130° to 180° F. Carnauba wax is a preferred vegetable wax.

A suitable base wax composition contains 40 percent of a mixture of petroleum waxes consisting of equal parts paraffin wax, having an ASTM D–87 melting point of about 153° F., and microcrystalline wax having an ASTM D–127 melting point of about 170° F., 10 percent carnauba wax such as Pure Refined No. 3 N.C. Carnauba, 5 percent polyethylene wax having a molecular weight of about 4,000, and 45 percent terpene resin such as Nirez 1135 with a softening point of about 135° C., a specific gravity (25°/25° C.) of 0.995, a color (Gardner) 1933–Hellig of 4 maximum, a saponification number of approximately 0, and a capillary tube melting point of 115° C. A filled pattern composition was made using 60 percent by weight of this base wax and 40 percent isophthalic acid which had been passed through a U. S. Standard 60 mesh screen, i.e., −250 microns. The resulting composition was characterized as follows:

| | | |
|---|---|---|
| Melting Point (ASTM D-127), °F. | | 173.8 |
| Congealing Point (ASTM D-938), °F. | | 157.5 |
| Brookfield Viscosity, cp. at | 180°F. | 558 |
| | 170°F. | 779 |
| | 165°F. | 1065 |
| | 160°F. | 1412 |
| % Ash Residue (1800°F. Combustion Temperature) | | 0.003 |
| ASTM D-1168 Coefficient of Cubical Expansion over temperature range 80°F. to 160°F. | | 0.00047 |

The coefficient of expansion of the base wax was 0.00075 which is 60 percent greater than that of the pattern material over the 80° F. to 160° F. temperature range.

Patterns were made with the above pattern material composition both on a Leyden, 1-pound shot wax injection machine with a non-agitated reservoir, and on a Tempcraft 10-pound shot machine with an agitated reservoir, at 160° F. and 145° F. injection temperatures, respectively, and both 1-minute and 45-second injection cycles with 200 p.s.i.g. injection pressure. Completely acceptable patterns were made with excellent surface detail reproduction, and no flow lines were observed in the patterns under these conditions.

Additional examples of base waxes of the compositions of this invention are given below in Table I.

TABLE I

Base A

| | |
|---|---|
| Paraffin Wax, 143°F. melting point | 20 |
| Microcrystalline Wax, 140°F. melting point | 20 |
| Carnauba Wax | 20 |
| Terpene Phenolic Resin LTP-100 (Pennsylvania Industrial Chem. Co.) having a softening point (ring and ball) of 100°C., an acid number nil, a specific gravity of 1.02, and a color (Gardner) of 7 | 40 |

Base B

| | |
|---|---|
| Paraffin Wax, 153°F. melting point | 30 |
| Microcrystalline Wax, 170°F. melting point | 30 |
| Candelilla Wax | 15 |
| Terpene Resin S-115 (Pennsylvania Industrial Chem. Co.) having a melting point of 115°C., a specific gravity (25°/25°/C.) of 0.97, an acid number of less than 1, a color (Gardner) of 4, and a bromine number of 5 | 25 |

Base C

| | |
|---|---|
| Paraffin Wax, 153°F. melting point | 25 |
| Microcrystalline Wax, 170°F. melting point | 30 |
| Carnauba Wax | 25 |
| Terpene Resin S-115 (see Terpene Resin S-115 above) | 25 |

Examples of filled waxes, I, II, III, IV and V were made according to Table II and the respective co-efficient of expansion data are listed in Table III for the base waxes and the filled waxes.

TABLE II

| | I | II | III | IV | V |
|---|---|---|---|---|---|
| Base A | 60 | – | – | – | – |
| Base B | – | 50 | – | – | – |
| Base C | – | – | 70 | 50 | 40 |
| Isophthalic acid | – | 50 | 30 | – | – |
| Orthophthalic acid | 40 | – | – | – | 60 |
| Terephthalic acid | – | – | – | 50 | – |

TABLE III

| Wax | Coefficient of Expansion |
|---|---|
| A | 0.00084 |
| B | 0.00130 |
| C | 0.00132 |
| I | 0.00069 |
| II | 0.00079 |
| III | 0.00092 |
| IV | 0.00086 |
| V | 0.00053 |

The above data demonstrate that the coefficient of expansion of a variety of base wax compositions is reduced in every case using the filler materials indicated, and the coefficient of expansion can be controlled by varying the amount of filler added to the base wax composition.

It is claimed:

1. In a process for forming a mold of desired shape in which a pattern material is shaped in a mold of the desired shape, the molded pattern material is coated with a slurry of finely divided refractory material, the coating is dried, the coatings and drying being repeated to build up a total refractory coating of a desired thickness and the pattern material removed by melting from within the coating to form a refractory mold, the improvement which comprises using as said pattern material a base wax melting at about 120° to 180° F. and containing finely divided solid filler particles of a member selected from the group consisting of isophthalic acid, terephthalic acid and orthophthalic acid, said filler particles being present in an amount of about 5 to 75 weight percent of the pattern material.

2. In the method of claim 1 wherein the maximum dimension of the filler particles is up to about 600 microns.

3. The method of claim 2 wherein the filler is isophthalic acid.

4. In the method of claim 3 wherein the maximum dimension of the filler particles is up to about 250 microns.

5. In the method of claim 4 wherein the base wax comprises a major amount of the pattern material.

6. In the method of claim 1 wherein the base wax contains about 5 to 40 weight percent paraffin wax, about 5 to 40 weight percent microcrystalline wax, about 5 to 40 weight percent vegetable wax and about 15 to 50 weight percent terpene resin.

7. In the method of claim 6 wherein the paraffin wax has a melting point in the range of about 135° to 160° F.

8. In the method of claim 7 wherein the microcrystalline wax has a melting point in the range of about 130° to 180° F.

9. In the method of claim 8 wherein the vegetable wax is carnauba wax.

10. A pattern material composition suitable for use in the lost wax process which consists essentially of base wax melting in the range of about 120° to 180° F. and about 5 to 75 percent by weight of the composition of finely divided filler particles selected from the group consisting of isophthalic acid, terephthalic acid and orthophthalic acid.

11. The composition of claim 10 wherein the maximum dimension of the filler particles is up to about 600 microns.

12. The composition of claim 11 wherein the maximum dimension of the filler particles is up to about 250 microns.

13. The composition of claim 12 wherein the filler is isophthalic acid.

14. The composition of claim 13 wherein the base wax comprises a major amount of the pattern material.

15. The composition of claim 10 wherein the base wax contains about 5 to 40 weight percent paraffin wax, about 5 to 40 weight percent microcrystalline wax, about 5 to 40 weight percent vegetable wax and about 15 to 50 weight percent terpene resin.

16. The composition of claim 15 wherein the paraffin wax has a melting point in the range of about 135° to 160° F.

17. The composition of claim 16 wherein the microcrystalline wax has a melting point in the range of about 130° to 180° F.

18. The composition of claim 17 wherein the vegetable wax is carnauba wax.

* * * * *